Figure 1:
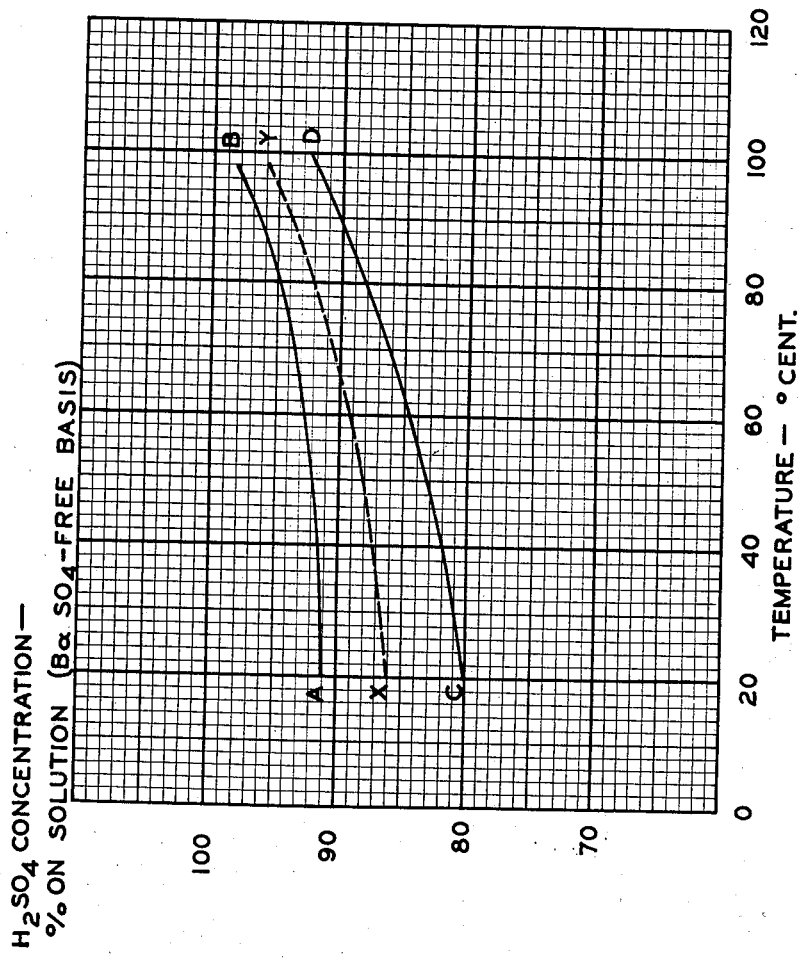

June 6, 1939.　　　L. T. WORK ET AL　　　2,161,650

MANUFACTURE OF BARIUM SULPHATE

Filed Dec. 27, 1934　　　2 Sheets-Sheet 1

INVENTORS
LINCOLN T. WORK
HUGH ALESSANDRONI
BY
Arthur Middleton
ATTORNEY.

June 6, 1939. L. T. WORK ET AL 2,161,650
MANUFACTURE OF BARIUM SULPHATE
Filed Dec. 27, 1934 2 Sheets-Sheet 2

INVENTORS
LINCOLN T. WORK
HUGH ALESSANDRONI
BY
Arthur Middleton
ATTORNEY.

Patented June 6, 1939

2,161,650

UNITED STATES PATENT OFFICE 2,161,650

MANUFACTURE OF BARIUM SULPHATE

Lincoln T. Work and Hugh Alessandroni, New York, N. Y.

Application December 27, 1934, Serial No. 759,340

4 Claims. (Cl. 23—122)

The present invention relates to the manufacture of pigments and more particularly to the manufacture of improved pigments including mineral sulphates of the alkaline earth metals with or without a pigment such as titanium and the like.

It is well known that several conventional methods have been employed for the production of mineral pigments such as barium sulphate. Thus, a well-known method for the production of commercial grades of barytes involves grinding the raw mineral until the particles have been reduced in size to less than 20 to 100 microns. In connection with the grinding method dry or liquid classification has been employed. This classification involves the separation of the oversize particles and returning them to the grinding mill. In some instances, for purposes of securing a more finely divided product, the precipitation method has been employed instead of the grinding method. This method contemplates the precipitation of the pigment, such as barium sulphate, in water. Generally speaking, there are three types of processes usually employed to carry the precipitation method into practice. In the first process, the raw barium sulphate ore is reduced in a kiln with carbon. After reduction the resulting sulphide product is leached and the impurities filtered off. Barium sulphate is precipitated from the solution by reaction with a sulphate in a well-known manner to produce the final precipitated pigment. The second process contemplates the fusion of rock barytes in a molten bath of salt and then striking the molten mass in water to precipitate barium sulphate as a pigment.

The third process involves the solution of rock barytes in concentrated sulphuric acid or oleum, and then precipitating barium sulphate by diluting the acid solution with water. The art has been aware of the fact that the foregoing three conventional processes now in use have objections and shortcomings. In the grinding method, it has not been practical to produce a pigment the major portion of which has particles finer than two or three microns. Consequently, the pigment produced by the grinding method does not have the hiding power which is potentially possible when the major portion of the particles have a size finer than two or three microns. In regard to the precipitation method, it is well-known that the operation and reagents are costly. The third process presents the disadvantage of requiring large and costly amounts of sulphuric acid in concentrated form. Although the investigators in the art have been diligently searching for a solution to the outstanding problem and for the provision of a practical, economical and commercial process, none of the processes proposed has been wholly acceptable, satisfactory, and successful.

We have discovered a process which overcomes the shortcomings and disadvantages of prior processes and which provides the art with a practical, satisfactory process for producing pigments having fine particles.

Generally speaking, we have discovered that pigments, such as for example barium sulphate, having fine particles of predetermined sizes, suitable for various uses in industry and especially for paint manufacture, can be produced by effecting a reaction between a solid, such as barytes, and sulphuric acid so as to produce a reaction-product slurry, or semi-solid mass, comprising a solid reaction product, for example essentially $BaSO_4.H_2SO_4$, and an aqueous solution of sulphuric acid and then effecting a further reaction between the ingredients of this slurry by mixing water with it under certain conditions to produce a second reaction product slurry which second slurry comprises essentially a less concentrated aqueous solution of sulphuric acid and a precipitated solid, for example $BaSO_4$, the particles of which have sizes essential within a predetermined range of sizes and which may be separated from said less concentrated aqueous solution of sulphuric acid as well as from contaminating impurities to produce a product suitable for use in industry.

We have discovered, too, that the above reaction product slurry comprising a solid reaction product, for example $BaSO_4.H_2SO_4$ and an aqueous solution of sulphuric acid may be simultaneously mixed with an aqueous solution containing titanium sulphate and sulphuric acid and with an additional amount of water under certain conditions to produce a second reaction-product slurry comprising simultaneously or co-precipitated solids, as for example $BaSO_4$ and $H_2TiO_3$ and a less concentrated solution of sulphuric acid which slurry may be treated in a like manner as above to produce a product likewise suitable for use in industry.

It will be understood that the solid reaction-product described above as essentially $$BaSO_4.H_2SO_4$$

may be a binary or ternary compound or a mixture of such and similar compounds. The exact nature of this solid reaction-product has not been fully determined but, nevertheless we have found that a solid product is formed and that it is possible to treat it to produce a finely divided precipitate, comprising BaSO₄, suitable for use in industry.

It will be understood that such a general procedure will be applicable in treating other alkaline earth sulphates to produce corresponding reaction-products.

It is a primary objective of this invention to provide a method whereby pigments may be produced in an economical manner through the elimination of costly and/or large amounts of reagents.

It is a further objective of this invention to provide a method for producing, through the treatment of a natural alkaline earth sulphate with sulphuric acid, a slurry or semi-solid mass comprising a solid product essentially a compound of the alkaline earth sulphate and sulphuric acid and an aqueous solution of sulphuric acid which slurry is suitable for use in the production of pigments.

It is a further objective of this invention to provide a method for precipitating pigments from a slurry or semi-solid mass comprising a solid product essentially an acid sulphate of an alkaline earth element and an aqueous solution of sulphuric acid.

It is a further objective of this invention to provide a method whereby certain impurities such as usually are found in naturally occurring alkaline-earth sulphates may be separated from pigments produced from such sulphates.

It is a primary objective of this invention to provide a method whereby the pigment, barium sulphate, may be produced from naturally occurring barytes or other suitable sources of barium sulphate in an economical manner through the elimination of costly and/or large amounts of reagents.

For purposes of further explanation the preferred method of applying the process to the production of precipitated barium sulphate is herein described as applied to the treatment of naturally occurring barytes.

We prefer to employ barytes which has been separated from such contaminating substances as clay, loam, etc. Such a barytes may be prepared by crushing and washing the crude product as it comes from the mining operations by means well-established in the industry.

In the first step of our process we prefer to employ essentially dry barytes which has been comminuted to sizes of less than 150 mesh. It will be understood that other sizes may be used and that larger sizes tend, relatively, to retard the rate at which the conversion reaction proceeds.

We prefer also to employ the sulphuric acid in the form of an aqueous solution containing essentially 93+% H₂SO₄, such a solution having a specific gravity of approximately 66° Bé., for the reason that this strength may be produced by ordinary and economic means now in use in the acid industry and further because such a concentration may also be economically produced by evaporating water from an aqueous solution of lesser concentration such as is produced by a by-product in our process.

Referring to the drawings, the curve AB in Fig. 1 sets forth approximately the lower limits of concentrations of H₂SO₄ solutions which may be employed at various temperatures to successfully initiate or start this reaction. It will be understood that the dash-line curve, XY in Fig. 1, is drawn to represent approximately, not to accurately set forth, conditions of acid concentration and temperature at which chemical equilibrium exists between the reagent and reaction-products involved in the reaction. Thus it will be understood that concentration lying in the zone between the curves AB and XY lie within the so-called metastable range of physical chemistry phenomena in which range the initiation of reaction is not readily accomplished. It will be understood that oleum—a solution of sulphuric acid and sulphur trioxide—may likewise be employed to effect the desired result.

We preferably mix substantially two parts, by weight, of 66 degrees Bé. sulphuric acid with one part, by weight, of the finely comminuted barytes, substantially free from moisture, in tanks equipped with agitating means suitable and adequate for effecting and maintaining a slurry of the ingredients and the resulting reaction products, substantially uniform in composition, at a temperature of approximately 50 degrees C. for periods as required for the essential completion of the reaction, possibly up to 72 hours or more.

It will be understood that the reaction between these reagents may essentially be illustrated by the following equation:

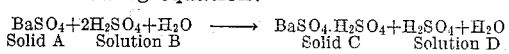

$$\underset{\text{Solid A}}{BaSO_4} + \underset{\text{Solution B}}{2H_2SO_4 + H_2O} \longrightarrow \underset{\text{Solid C}}{BaSO_4 \cdot H_2SO_4} + \underset{\text{Solution D}}{H_2SO_4 + H_2O}$$

Further, since some of the sulphuric acid in the reagent Solution B enters the reaction-product Solid C the reaction-product Solution D is less concentrated, as to H₂SO₄ content, than Solution B. Also, since the reaction will not proceed in concentrations of acid lying below those concentrations represented by the dash-line curve XY in Fig. 1, which curve represents approximately the conditions at which chemical equilibrium occurs, it follows that, upon completion of the reaction, the reaction-product Solution D must contain a concentration of H₂SO₄ in excess of those so represented. These facts limit the ratio of barytes to acid which may be employed in effecting a completed reaction to a minimum of approximately one part of substantially 66 degrees Bé. sulphuric acid to essentially one part of substantially pure baryte. When reagent Solution B contains a higher percentage of H₂SO₄, other conditions remaining the same, a lower ratio may be used and when it contains a lower percentage a higher ratio must be used.

It will also be understood that when lower ratios of acid and barytes are employed the resulting mixture of ingredients and/or reaction products tends to be less fluid and more of the nature of a paste the thorough mixing of which becomes more difficult and requires a modification in the employed means for mixing. For effecting the reaction in this paste-like mixture a ball mill may be used. With still lower ratios the resulting mixture of ingredients and/or reaction products approaches a mass of zero fluidity and the reaction after a suitable mixing of the reagents may be effected in a den or soaking pit.

It will be understood that a partial conversion of the barytes may be effected through the use of a deficiency of sulphuric acid and that under certain conditions the reaction-products may be effectively employed in the subsequent steps of the process to produce desired products.

It will be understood that such impurities as are introduced into the reaction with the barytes, such as silica, etc., remain in the reaction-product mixture as such and that iron and iron compounds tend to be converted to sulphate compounds and remain as such.

Higher temperatures tend to make necessary the use of higher concentrations in the sulphuric acid Solution B or the use of larger ratios of acid to baryte if the reaction is to be essentially completed within a given period of time. In lower ranges of temperature, as at atmospheric temperatures, this is possibly less marked than in higher ranges.

The second step in our process provides for mixing the reaction-product slurry or mass above described as comprising a Solid C, essentially BaSO₄.H₂SO₄ and a Solution D essentially an aqueous solution of sulphuric acid, with water in an amount sufficient to so dilute the reaction-product Solution D that the solid reaction-product C will be decomposed or converted to and precipitated as BaSO₄.

The precipitation reaction may be essentially illustrated by the following equation:

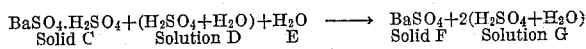

To successfully initiate this reaction we have found that the reagent water E may be employed in an amount sufficient to produce a reagent solution—a mixture of solution D and reagent water E—in which the concentration of sulphuric acid is less those concentrations of solutions indicated approximately by the curve CD in Fig. 1. It will further be understood that, to effect a complete conversion of the Solid C to Solid BaSO₄ F, the reagent water must be used in an amount sufficient to produce a reaction product Solution G in which the concentration of sulphuric acid is less than those concentrations at which chemical equilibrium will occur as represented by the curve XY in Fig. 1. It will further be understood that the initiation of the reaction is not readily accomplished in concentrations of reagent solution (D+E) which lie within the so-called metastable range bounded by the approximate curves CD+XY. We have also found that other factors being equal, the use of larger amounts of reagent water E tends to precipitate the Solid F, BaSO₄, in a finer state of subdivision.

It will be understood that a suitable amount of an aqueous solution of sulphuric acid of suitable composition (concentration) may be substituted for the reagent water E, as employed above, in effecting this reaction. Such a solution of sulphuric acid may be obtained from washing with water previously made precipitates F to free them from the sulphuric acid Solution G. When such a solution of sulphuric acid is employed as a precipitant the reaction may be essentially illustrated as follows:

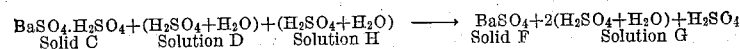

It will be apparent, since the concentration of sulphuric acid in Solution G must be less than that in Solution D, that the concentration of H₂SO₄ in the reagent Solution H must be less than that in Solution G and further that Solution H must be used in an amount sufficient to produce desired concentration in Solution G.

In the preferred method the reaction-product slurry comprising the products resulting from reacting two parts of 93% sulphuric acid and one part of barytes is mixed with amounts of reagent Solution H sufficient to produce a reaction-product Solution G having a concentration of sulphuric acid in excess of 30% H₂SO₄ and less than 80%, since we have found that the use of such amounts yields sizes of precipitated particles within a range suitable for various known uses of the material and since the addition of larger amounts tends to render less economic the subsequent evaporation of water from the reaction-product Solution G to produce the aqueous solution of sulphuric acid containing essentially 93% H₂SO₄ and suitable for reuse in the first step of the process as Solution B.

In the preferred method an amount of the reaction product slurry composed of Solid C, essentially BaSO₄.H₂SO₄, and Solution D is mixed with the reagent Solution H of dilute sulphuric acid in a tank equipped with agitating means adequate to effect and maintain a uniform suspension of the mixture for the period necessary to effect essentially the completion of the reaction. The extent of this period is relatively short but tends to increase as the ingredients are mixed to produce reaction-product Solutions G higher in sulphuric acid content.

It is obvious that the effecting of this conversion-precipitation reaction when the initial reaction-product is of low fluidity, as described above when a low ratio of sulphuric acid to barytes is employed in the initial reaction, may require the use of a ball mill or suitable revolving mixing drum.

It will be understood by those familiar with the art, that the mechanism of this conversion-precipitation reaction probably operates as illustrated by the following theory, when the reagent water E has been mixed with the sulphuric acid Solution D the Solid C, essentially BaSO₄.H₂SO₄, begins to dissolve and decompose and the solid reaction-product F begins to precipitate. These actions proceed simultaneously until the reaction is essentially completed or is stopped by too high a concentration of H₂SO₄ in the reaction-product Solution G. Because of these simultaneous actions the concentration of BaSO₄ in the solution phase of the reacting mixture, from which phase precipitation is being effected, is a function of the rates at which the two actions proceed so that when compared to like concentrations encountered in the precipitation of BaSO₄ from a solution phase not in contact with a solid such as BaSO₄.H₂SO₄, said concentration of BaSO₄ averages higher than said like concentrations during the period of reaction. It follows, since the size of the precipitated particles is a function of the concentration of BaSO₄ in the solution phase from which precipitation is being effected, that other conditions being the same, the presence of the Solid F essentially BaSO₄.H₂SO₄, materially influences the size of the resulting precipitated particles of BaSO₄.

A third step in the process comprises essentially separating the two components of the reaction-product slurry which slurry comprises essentially the precipitated Solid F BaSO₄ and the aqueous Solution G of sulphuric acid. This separation may be effected by sedimentation means, as, for example, in a series of thickeners employing counter-current washing or with filters which collect the solid and permit of washing it.

It is desirable that this separation step yield the Solid F BaSO₄ essentially free from H₂SO₄ and sulphuric acid solutions of three concentrations, namely, one solution having a concentration of $H_2SO_4$ corresponding to the reaction product Solution G suitable for concentration and reuse as Solution B, a second solution having a concentration of $H_2SO_4$ corresponding to reagent Solution H suitable for use as such, and a third solution having a concentration of sulphuric acid of 1 or 2% (say less than 5%). This may obviously be effected by separating the liquid effluent from the separating means into mother liquor (Solution G), first washings (Solution H) and second washings. The third or dilute solution may be economically discarded and such a procedure effects the elimination of iron (such as may have been introduced in the form of an impurity with the barytes) from the precipitate and from the cyclic system when, as above indicated and later described, the mother liquor (Solution G) is returned to the first step of the process, via a concentrating step, for reuse as reagent Solution B.

It will be understood that this washing operation will yield a slurry or filter cake comprising a mixture of the solid reaction-product F $BaSO_4$ and water said mixture being essentially free from the acid.

It will be understood that while this washing operation will yield such a slurry or filter cake essentially free from $H_2SO_4$, the removal of the last traces of acid by means of washing is difficult of accomplishment. Because of this we prefer to neutralize such last traces of acid with a suitable alkaline material, such as lime, by mixing said reagent with said slurry (or a slurry produced from said filter cake and additional water) in a suitable agitating or mixing apparatus.

It will also be understood that the reaction-product Solution G comprising essentially an aqueous solution of sulphuric acid, in which the $H_2SO_4$ content may range from 30% to 80%, may be treated with heat so as to evaporate water from said solution.

By such concentration means water may economically be removed to a point where a sulphuric acid solution containing 93% or more of $H_2SO_4$ may be produced which solution is suitable for reuse as reagent Solution B.

A fourth step in the process comprises separating, by suitable classification means the reaction-product Solid F essentially $BaSO_4$ into essentially larger particles and smaller particles. This step essentially separates gritty materials, such as particles of incompletely reacted barytes, and particles of silica and other similar impurities such as were introduced into the process as impurities in the barytes A, from the precipitated, finely divided reaction-product F $BaSO_4$. It is preferably performed on the slurry, comprising the washed Solid F suspended in water, resulting from the above described washing operation and by employing the principles of hydraulic classification.

Such a classification may be effected in a continuous manner by introducing into a suitable tank a slurry comprised of the washed and neutrol solid from step three suspended in a suitable amount of water and maintaining conditions in said tank so that the finer particles of solid rise with currents to a point of overflow near the top where they together with most of the water are withdrawn while the coarser particles being too heavy to be raised by said currents settle to the bottom of said apparatus and together with the remainder of the water are withdrawn therefrom. It is obvious that such classification may be successfully effected prior to the above described washing step in which event its accomplishment is rendered more difficult by the presence of the sulphuric acid Solution G. It is obvious, too, that this step yields a solid product comprising essentially the precipitated Solid F free from grit and suitable for use as a pigment in paint manufacture or for other industrial uses.

The foregoing steps having been completed, the precipitated solid is in a condition to be completely separated from the then accompanying liquid (water) as, for example, by dewatering to produce a filter cake with subsequent drying of the cake to evaporate the last portions of moisture. The drying is preferably effected under conditions which will permit any portion of the solid particles from reaching temperatures in excess of 100 degrees C. and will prevent any essential change in the size of the individual particles.

It will be understood that relations analogous to those illustrated in Fig. 1 exist in connection with the like salts of the alkaline earth elements, calcium and strontium and that operations as above described, when modified as to degree of concentration and temperature, will produce similar results with said salts of these elements.

Figure 2:
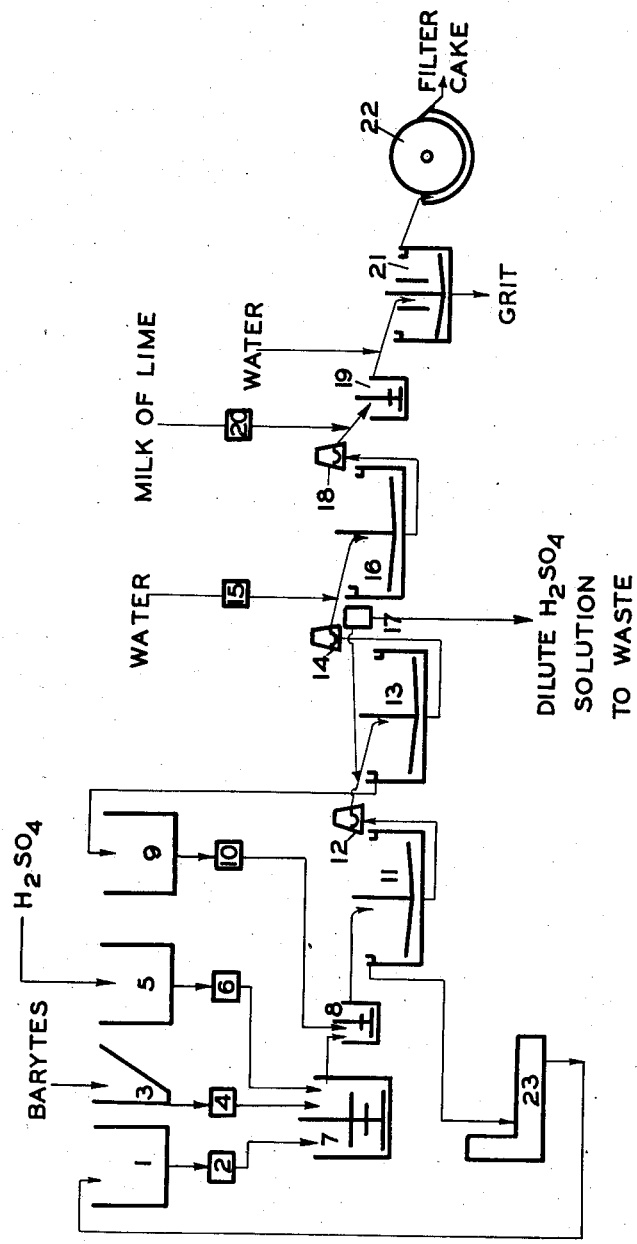

For purposes of further explanation the diagrammatic flow-sheet shown in Fig. 2 illustrates equipment, and the interrelation of same, with which the steps of the process may be effected in essentially a continuously operating manner and in a commercial way.

Concentrated sulphuric acid which has been reclaimed subsequent to use in a previous operation of the process is stored in a suitable tank 1. Finely ground, washed barytes is stored in a suitable bin 3. A supply of concentrated sulphuric acid from a source independent of the process is stored in a suitable tank 5 said acid to be used to replace that acid discarded and lost from the system in the operation of the process.

Item 4 represents a meter-feeding device suitable for feeding baryte from bin 3 at a predetermined rate in a substantially continuous manner for example a so-called Shaeffer poidometer.

Items 2 and 6 represent meter-feeding devices, such as the so-called Howard acid feeder, suitable for feeding sulphuric acid from the storage tanks respectively 1 and 5.

Item 7 comprises a reaction tank, or the first of a series of same, equipped with an agitating mechanism adequate for producing and maintaining a uniform mixture of its contents and of a size suitable for retaining, under conditions suitable for reaction and when filled to a point of overflow, the input of ingredients for a period of time sufficient to effect the reaction involved in the first step of the process.

As previously described the first step in the process involves reacting finely ground barytes and sulphuric acid to produce a reaction product slurry comprising $BaSO_4.H_2SO_4$ suspended in sulphuric acid. Thus, this first step may be effected by coincidentally and in a continuous manner, introducing at predetermined relative and closely controlled rates, barytes from bin 3 via meter-feeding device 4, reclaimed sulphuric acid from tank 1 via meter-feeding device 2 and "make-up" sulphuric acid, from tank 5 via meter-feeding device 6, into tank 7, or a series of same, wherein the flow of ingredients is retained for that period of time required to effect the desired reaction when said tank or series of tanks is filled to a point of overflow via which the resulting reaction-product slurry may pass to the equipment employed in effecting the second step of the process.

Of the equipment involved in effecting the second step of the process item 8 represents a reaction tank, or the first of a series of same, which is equipped with an agitating mechanism adequate for producing and maintaining its contents in the form of a uniform mixture and is of a size that, when filled to a point of overflow, will retain the flow of input ingredients for a period of time sufficient to effect the reaction involved in the second step of the process.

Item 9 represents a storage tank suitable for retaining a supply of dilute sulphuric acid such as has been previously described herein as solution H and which is to be used as a precipitant in the second step of the process.

Item 10 represents a meter-feeding device, such as a Howard acid feeder, suitable for feeding, at a predetermined and controlled rate, the dilute sulphuric acid from storage tank 9.

As previously described the second step in the process involves mixing the reaction-product slurry, resulting from the first step and issuing from tank 7, with diluted sulphuric acid (Solution H) so as to convert the solid $BaSO_4.H_2SO_4$ to solid $BaSO_4$. Thus this second step may be effected by, coincidentally and in a continuous manner, introducing the reaction product slurry overflowing from tank 7 and dilute sulphuric acid from tank 9 via meter-feeder 10, the rate of acid feed being controlled in a predetermined relation to the inflow of slurry, into tank 8 wherein the flow of ingredients is retained for that period of time required to effect the reaction when said tank or series of tanks is filled to a point of overflow via which the resulting reaction product slurry may pass to the equipment employed in the third step of the process.

The third step in the process involves treating the reaction-product slurry flowing from the second step to separate the precipitated solid, $BaSO_4$, from the accompanying sulphuric acid solution. This may be effected by countercurrent decantation in a series of three or more thickeners, as represented in Fig. 2 by items 11, 13 and 16. In this step the continuous flow of reaction-product slurry from tank 8 is introduced into thickener 11 wherein the solids settle so as to permit of overflowing from the thickener a portion of the solution of sulphuric acid (previously described as reaction product Solution G) in an essentially clear condition. (This overflow solution is treated in a separate step as will be described later.)

The settled solids are withdrawn in a continuous manner from the bottom of thickener 11 in the form of a thickened sludge by pump 12. They are further conveyed in a continuous manner and in the form of sludges of varying densities, thru the washing system comprising essentially thickener 13, pump 14, thickener 16 and pump 18. As will be noted water is introduced into the system via item 15 which may be a suitable meter-feeding device such as a Howard acid feeder. This water is mixed with the solid-containing sludge from pump 14 thus diluting the acid liquor portion of that sludge. This dilute acid liquor after separation from solids in thickener 16 overflows from said thickener to a splitter box, item 17, from which a predetermined portion of it is conveyed to a point where it is mixed with sludge from pump 12. The remaining portion of said dilute acid liquor from splitter box 17 is eliminated from the process so that, primarily, the system may be purged of soluble impurities. The mixture of dilute acid liquor from splitter box 17 and sludge from pump 12 is separated in thickener 13 so as to produce an overflow of a substantially clear solution of sulphuric acid of suitable concentration for storing in tank 9 to be used as a precipitant (previously described as Solution H) in the second step of the process. Thus it will be apparent that the amount of the dilute acid solution introduced into thickener 13 from splitter box 17 may be controlled to produce the concentration of acid in the overflow from thickener 13 so that it will be suitable for use as said precipitant.

Thus it will be understood that water is introduced into thickener 16, via feeder 15, in an amount sufficient to reduce the $H_2SO_4$ content of the sludge leaving the thickener via pump 18 to substantially a minimum. Thus, too, it will be understood that a series of thickeners with corresponding pumps, operating on the countercurrent principle, may be employed in place of thickener 16 and that by so doing the amount of wash water employed may be reduced.

The sludge from pump 18 containing substantially a minimum of sulphuric acid may, when it is desirable, be treated with milk of lime so as to neutralize the last traces of said acid. This may be accomplished by mixing milk of lime introduced, via meter-feeder 20 which may be of Howard feeder type, in a tank 19 equipped with an agitating device adequate to produce and maintain a uniform mixture of the tank contents and of a size suitable for retaining the flow of sludge for up to approximately five minutes.

A fourth step in the process involves separating larger particles of solids present in the sludge from pump 18 or from tank 19 from the smaller particles of solids therein so as to produce a product substantially free from grit.

This may be effected by diluting the sludge from said sources with water and introducing the so-diluted sludge into a classifying tank or hydroseparator 21 in which the finely divided precipitated solids are carried upwards by currents of the liquids therein to a point of overflow while the coarser solids settle despite said currents and may be withdrawn in the form of a slurry from the bottom of said tank 21 and discarded.

The finer solids, overflowing from said tank 21 in the form of a dilute slurry may be conveyed to a dewatering filter 22, suitable for producing a filter cake which may be used as such or further dried as desired.

Returning to the third step in the process and particularly to that portion of clear sulphuric acid solution which overflows from thickener 11 and which is to be reclaimed. As previously stated herein this solution will contain from 30% to 70% $H_2SO_4$ and if it is to be reused in the first step its acid content must be revised, in our preferred method to substantially 93% $H_2SO_4$. This may be done by distilling water vapor from the less concentrated solutions in a suitable acid concentrator, item 23 in the drawing, after which the reclaimed acid is conveyed to tank 1 for reuse in the first step of the process. This operation may be effected in an acid concentrator such as is used in connection with reclaiming spent acid in the mineral oil refining industry such as for example the so-called Chemico acid concentrator.

We believe that, when the description herein given is read and considered in connection with the accompanying drawings, the invention, its characteristic features, its utility and the method of operating it, together with objectives and advantages beyond those specifically noted in the opening paragraphs hereof, will be readily understood and appreciated.

It is to be understood that the equations hereinbefore set forth are not meant to show balance but are merely illustrative of the chemical reactions which take place.

This is a continuation in part of our patent application Serial No. 620,974 filed July 5, 1932, for which this case is substituted.

What we claim is:

1. In a process for manufacturing barium sulphate in finely divided solid form the particle size of which is controlled so that the sizes of the major portion of said particles lie within the range of sizes suited for use as pigments, the steps which comprise intimately contacting in a reaction zone at temperatures of substantially 50 centigrade degrees one part of finely ground barytes, essentially $BaSO_4$, with two parts of an aqueous solution of sulphuric acid containing substantially 93+% of $H_2SO_4$ to produce a reaction-product slurry comprising a solid-phase product, essentially $BaSO_4.H_2SO_4$ suspended in an aqueous solution of essentially sulphuric acid; then intimately contacting in a second reaction zone at temperatures of at least substantially 50 centigrade degrees said reaction-product slurry with an amount of water to produce a second reaction-product slurry comprising a solid-phase product essentially $BaSO_4$ in finely divided form suspended in an aqueous solution of essentially sulphuric acid containing from 30 to 70% of $H_2SO_4$.

2. In a process of manufacturing barium sulphate in finely divided solid form suitable for use as a pigment, the steps of subjecting ground barytes to the action of an aqueous solution of sulphuric acid having a concentration of $H_2SO_4$ at or above values substantially determined by a curve defined by the points 91% at 20° C., 91+% at 35° C., 92% at 50° C., 93% at 65° C., 95% at 80° C. and 97+% at 95° C., in such proportions that there is formed a slurry composed of essentially barium acid sulphate in solid form suspended in a solution of $H_2SO_4$, then adding an aqueous diluent to said slurry until the solution of sulphuric acid has a concentration of $H_2SO_4$ at or below values substantially determined by a curve defined by 80% at 20° C., 82% at 35° C., 84% at 50° C., 85% at 65° C., 88% at 80° C. and 91% at 95° C., and thereby forming a slurry composed of essentially barium sulphate in finely divided solid form suspended in a solution of sulphuric acid.

3. In a process as defined in and by claim 2, the additional step of substantially separating the solid compounds of said last mentioned slurry from the liquid components thereof.

4. In a process of manufacturing barium sulphate in finely divided solid form suitable for use as a pigment, the steps of subjecting ground barytes to the action of an aqueous solution of sulphuric acid to form a slurry composed of essentially barium acid sulphate in solid form suspended in a solution of $H_2SO_4$, said reaction being carried out in a manner so that upon the completion thereof the said solution of sulphuric acid will have a concentration of $H_2SO_4$ at or above values substantially determined by a curve defined by the points 86% at 20° C., 87% at 35° C., 88% at 50° C., 90% at 65° C., 92% at 80° C. and 95% at 95° C., then adding an aqueous diluent to said slurry until the solution of sulphuric acid has a concentration of $H_2SO_4$ at or below values substantially determined by a curve defined by 80% at 20° C., 82% at 35° C., 84% at 50° C., 85% at 65° C., 88% at 80° C. and 91% at 95° C. and thereby forming a slurry composed of essentially barium sulphate in finely divided solid form suspended in a solution of sulphuric acid.

LINCOLN T. WORK.
HUGH ALESSANDRONI.